US010033206B2

(12) United States Patent
Lee (10) Patent No.: US 10,033,206 B2
(45) Date of Patent: Jul. 24, 2018

(54) OVERCHARGE PROTECTION CIRCUIT AND METHOD OF CONTROLLING THE SAME

(71) Applicant: HYUNDAI MOBIS CO., LTD., Seoul (KR)

(72) Inventor: Ho-Young Lee, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 127 days.

(21) Appl. No.: 15/261,636

(22) Filed: Sep. 9, 2016

(65) Prior Publication Data

US 2017/0077726 A1 Mar. 16, 2017

(30) Foreign Application Priority Data

Sep. 11, 2015 (KR) ........................ 10-2015-0129117

(51) Int. Cl.
*H02J 7/16* (2006.01)
*H02J 7/04* (2006.01)
*H02J 7/00* (2006.01)

(52) U.S. Cl.
CPC .......... *H02J 7/0029* (2013.01); *H02J 7/0068* (2013.01); *H02J 7/0083* (2013.01); *H02J 2007/0037* (2013.01)

(58) Field of Classification Search
CPC .................................................. H02J 7/0029

USPC ........................................................ 320/162
See application file for complete search history.

(56) References Cited

U.S. PATENT DOCUMENTS

| 4,755,735 A * | 7/1988 | Inakagata ............. H02J 7/0091 320/150 |
| 6,307,349 B1 * | 10/2001 | Koenck ............. H01M 10/4257 320/112 |
| 2002/0101218 A1 * | 8/2002 | Koenck ............. G01R 31/3655 320/140 |

FOREIGN PATENT DOCUMENTS

KR 10-1457986 B1 11/2014
KR 10-2015-0012425 A 2/2015

* cited by examiner

*Primary Examiner* — Suresh Memula
(74) *Attorney, Agent, or Firm* — Knobbe Martens Olson & Bear LLP (57) ABSTRACT

An overcharge protection circuit may include a battery, a battery management system (BMS) having an overcharge sensing unit for detecting cell voltage of the battery, comparing the cell voltage with a preset overcharge voltage, and then generating either a signal indicative of normal connection of the battery or an overcharge signal depending on a result of the comparison and a switch control unit for generating a control signal depending on a result of comparing a hold-up time of the overcharge signal with a preset hold-up time of the overcharge signal, and a switch for connecting or blocking a power source for supplying charging power to the battery in response to the control signal.

18 Claims, 6 Drawing Sheets

OVERCHARGE PROTECTION CIRCUIT AND METHOD OF CONTROLLING THE SAME

CROSS-REFERENCE(S) TO RELATED APPLICATIONS

This application claims priority to Korean Patent Application No. 10-2015-0129117 filed on Sep. 11, 2015, the disclosure of which is incorporated herein by reference in its entirety.

BACKGROUND

Field

The present disclosure relates to an overcharge protection circuit, and more specifically to an overcharge protection circuit and a method of controlling the overcharge protection circuit, which are intended to physically prevent an excessive charging phenomenon that occurs when a battery management system (BMS) is in an abnormal operation.

Description of the Related Art

Generally, electric vehicles include a battery system with a plurality of battery. The battery system may include an overcharge protection circuit. Common overcharge protection circuits comprise a voltage sensing circuit for sensing overcharge and a relay control circuit for controlling and blocking a relay in response to the detected overcharge.

SUMMARY

An aspect of the present invention is to provide an overcharge protection circuit designed by a robust design approach with noise factors reduced such that power supplying to a battery is shut off when the battery is determined as having been overcharged through sensing cell voltage of the battery while power is stably supplied to the battery during normal operation. In addition, another aspect of the present invention is to provide a method of controlling the overcharge protection circuit.

Yet another aspect of the present invention is to provide an overcharge protection circuit and a control method thereof, by which even if a battery management system (BMS) is in an abnormal operation when the battery is overcharged, power supplying to a battery is shut off.

Further, a still another aspect of the present invention is to provide an overcharge protection circuit and a method of controlling the same, by which even if a CPU for the overcharge protection circuit is removed, reliability can be enhanced and manufacturing cost can be reduced as well.

Other aspects and advantages of the present invention can be understood by the following description, and become apparent with reference to the embodiments of the present invention. Also, it is obvious to those skilled in the art to which the present invention pertains that the aspects and advantages of the present invention can be realized by the means as claimed and combinations thereof.

A further aspect of the present invention provides an overcharge protection circuit designed by a robust design approach with noise factors reduced such that power supplying to a battery is shut off when the battery is determined as having been overcharged through sensing cell voltage of the battery while power is stably supplied to the battery during normal operation.

The overcharge protection circuit comprises: a battery; a battery management system (BMS) having an overcharge sensing unit for detecting cell voltage of the battery, comparing the cell voltage with a preset overcharge voltage, and then generating either a signal indicative of normal connection of the battery or a signal indicative of overcharge (hereinafter, the "overcharge signal") depending on a result of the comparison and a switch control unit for generating a control signal depending on a result of comparing a hold-up time of the overcharge signal with a preset hold-up time of the overcharge signal; and a switch for connecting or blocking a power source for supplying charging power to the battery in response to the control signal.

In an embodiment, the BMS may further comprise an overcharge signal processing unit for processing the overcharge signal to reduce noise.

In an embodiment, the overcharge signal processing unit comprises an input end filter for filtering and stabilizing the overcharge signal and two-stage Schmitt triggers for stabilizing the filtered overcharge signal to prevent malfunction and converting the signal to an enable signal for enabling the switch control unit.

In an embodiment, the overcharge sensing unit comprises a plurality of distribution resistances connected in series for controlling the cell voltage and a shunt regulator connected to the distribution resistances to generate the overcharge signal by being electrically conducted when the cell voltage is greater than the preset overcharge voltage.

In an embodiment, the preset overcharge voltage may be set by using resistance values of the distribution resistances and voltages of the shunt regulator.

In an embodiment, the overcharge signal processing unit comprises a capacitor disposed between the two-stage Schmitt triggers to control a reaction rate of the filtered overcharge signal with capacitance.

In an embodiment, the overcharge signal processing unit may adjust time constant set by the capacitor and resistances connected in parallel to the capacitor such that the overcharge signal processing unit does not operate even when erroneous operation of the overcharge signal occurs due to noise.

In an embodiment, the switch may be a relay device.

In an embodiment, the switch control unit may comprise a single buffer chip.

Another further aspect of the present invention provides a method of controlling an overcharge protection circuit, the method comprising a cell voltage sensing step in which an overcharge sensing unit of a battery management system (BMS) detects cell voltage of a battery; a voltage comparison step in which the overcharge sensing unit of the BMS compares the cell voltage with a preset overcharge voltage; an overcharge signal generating step in which the overcharge sensing unit of the BMS generates either a signal indicative of normal connection of the battery or an overcharge signal of the battery depending on a result of the comparison; a control signal generating step in which a switch control unit of the BMS generates a control signal depending on a result of comparing a hold-up time of the overcharge signal with a preset hold-up time of the overcharge signal; and a connecting/blocking step in which a switch connects or blocks a power source for supplying charging power to the battery in response to the control signal.

In an embodiment, the control signal generating step further comprises a noise reduction step in which the overcharge signal processing unit of the BMS processes the overcharge signal to reduce noise.

In an embodiment, the noise reduction step comprises a filtering and stabilizing step in which an input end filter of the overcharge signal processing unit filters and stabilizes the overcharge signal and a conversion step in which two-stage Schmitt triggers of the overcharge signal processing unit stabilize the filtered overcharge signal to prevent malfunction and convert the signal to an enable signal for enabling the switch control unit.

According to embodiments of the present invention, a CPU for the overcharge protection circuit can be removed and the circuit can be simplified so that malfunction can be prevented and costs can be reduced.

Further, according to embodiments of the present invention, reliability of preventing overcharge can be enhanced by adding a signal processing function.

Moreover, according to embodiments of the present invention, the overcharge protection circuit can be designed so as to robust against noise by using an input end filter and a Schmitt trigger.

It is to be understood that both the foregoing general description and the following detailed description of according to embodiments the present invention are explanatory and are intended to provide further explanation of the invention as claimed.

BRIEF DESCRIPTION OF THE DRAWINGS

The above and other aspects, features and other advantages of the present invention will be more clearly understood from the following detailed description taken in conjunction with the accompanying drawings, in which.

DESCRIPTION OF EMBODIMENTS

The present invention may be implemented in many altered forms and have various embodiments. Therefore, an embodiment is illustrated in the drawings and described in detail in the following description. However, the disclosure herein is not intended to limit the present invention to an embodiment and should be understood as covering all modifications, equivalents and substitutions falling within the spirit and scope of the invention.

Like reference numerals are used to designate like elements throughout the drawings and the description with reference to the drawings.

Although the terms "first," "second," etc. may be used herein to describe various components, these components should not be limited by these terms. These terms are used merely to distinguish one element from another.

For example, a first component may be designated as a second component and similarly a second component may be designated as a first component without departing from the scope of the present invention. The term "and/or" includes all combinations or any of a plurality of the associated listed items.

All terms including technical or scientific terms, unless being defined otherwise, have the same meaning generally understood by a person having ordinary skill in the art pertaining to the present invention.

The terms that are the same as the ones defined in a commonly-used dictionary should be interpreted as including the meaning consistent with the meaning in the context of the related art, and should not be interpreted as being ideally or excessively formal meaning unless they are explicitly defined otherwise herein.

Generally, overcharge protection circuits may comprise a voltage sensing circuit for sensing overcharge and a relay control circuit for controlling and blocking a relay in response to the detected overcharge. For this purpose, the voltage sensing circuit comprises a Zener diode for a non-operating voltage range, a distribution resistor for actuating a shunt regulator, a photo coupler for transmitting an overcharge signal to the relay control circuit, etc. In addition, the relay control circuit comprises an AND gate for integrating a signal for controlling the relay by a central processing unit (CPU) and a signal controlled by a D flip-flop, a field effect transistor (FET) for turning on/off the relay, etc.

Accordingly, in case of such overcharge protection circuit, only when an input signal is low under the state that voltage is equal to or higher than a set voltage of the Zener diode, clock of the D flip-flop is in a rising edge and a set input signal of the D flip-flop is low, output of the D flip-flop is changed from high to low and then the FET for controlling the relay is opened. When overcharge is detected by this operation, the relay is blocked to prevent further charging, thereby preventing the overcharge.

However, such overcharge protection circuits have a disadvantage that there is increasingly likelihood of malfunction due to complex operation of the D flip-flop. In addition, since a CPU for the overcharge protection circuit is required, costs may increase.

Further, it may be impossible to control operation of the circuit to be delayed and function of filtering noise is insufficient.

Hereinafter, an overcharge protection circuit and a method of controlling the overcharge protection circuit according to an embodiment of the present invention will be described in detail with reference to the accompanying drawings.

Figure 1:
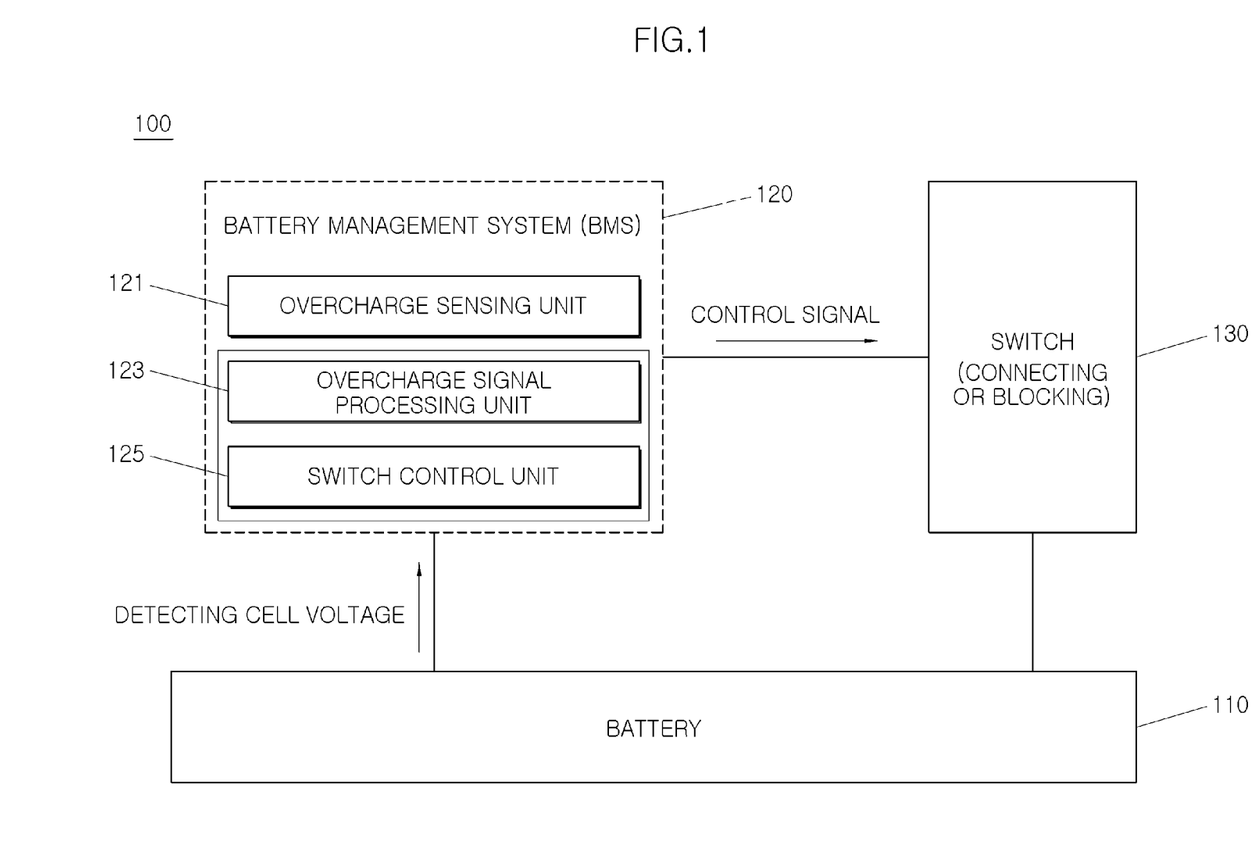
FIG. 1 is a block diagram of an overcharge protection circuit according to an embodiment of the present invention.

FIG. 1 is a block diagram of an overcharge protection circuit according to an embodiment of the present invention. Referring to FIG. 1, the overcharge protection circuit 100 comprises a battery 110, a battery management system (BMS) 120 for detecting cell voltage of the battery 110 and connecting a charging power source or blocking the charging power source when the battery is overcharged; and a switch 130 for connecting or blocking the charging power source in response to control of the BMS.

The battery 110 includes battery cells arranged in series and/or in parallel and may be a high voltage battery for electric vehicles such as a nickel metal battery, a lithium ion battery, a lithium polymer battery, all-solid-state battery and the like. In general, the high voltage battery refers to a battery used as a power source for moving electric vehicles, wherein the high voltage means a high voltage of 100V or more. However, the battery to which embodiments of the present invention are applied is not limited to such a high voltage battery, but may be a low voltage battery.

The BMS 120 comprises an overcharge sensing unit 121 for detecting cell voltage of the battery 110 and determining whether the battery is overcharged, an overcharge signal processing unit 123 for processing an overcharge signal resulting from overcharging and performing removal of noise and/or stabilization, and a switch control unit 125 for controlling ON/OFF of the switch 130 in response to the overcharge signal.

Figure 2:
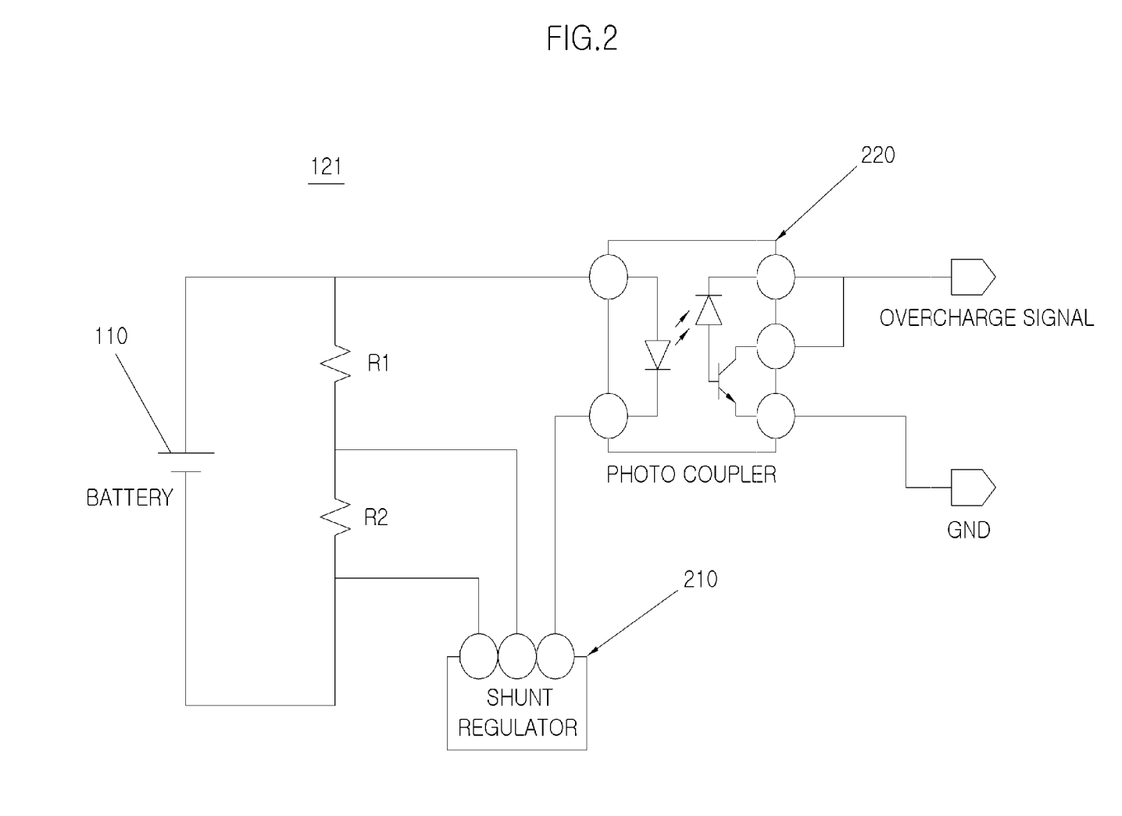
FIG. 2 is a constitution diagram of a circuit of an overcharge sensing unit shown in FIG. 1.

The overcharge sensing unit 121 detects the cell voltage of the battery 110 and compares the detected cell voltage with a preset overcharge voltage. As a result of the comparison, the overcharge sensing unit 121 generates a signal indicative of normal connection when the battery is not overcharged and an overcharge signal when the battery is overcharged. Detailed circuit configuration of the overcharge sensing unit 121 is shown in FIG. 2 and this will be described later.

Figure 3:
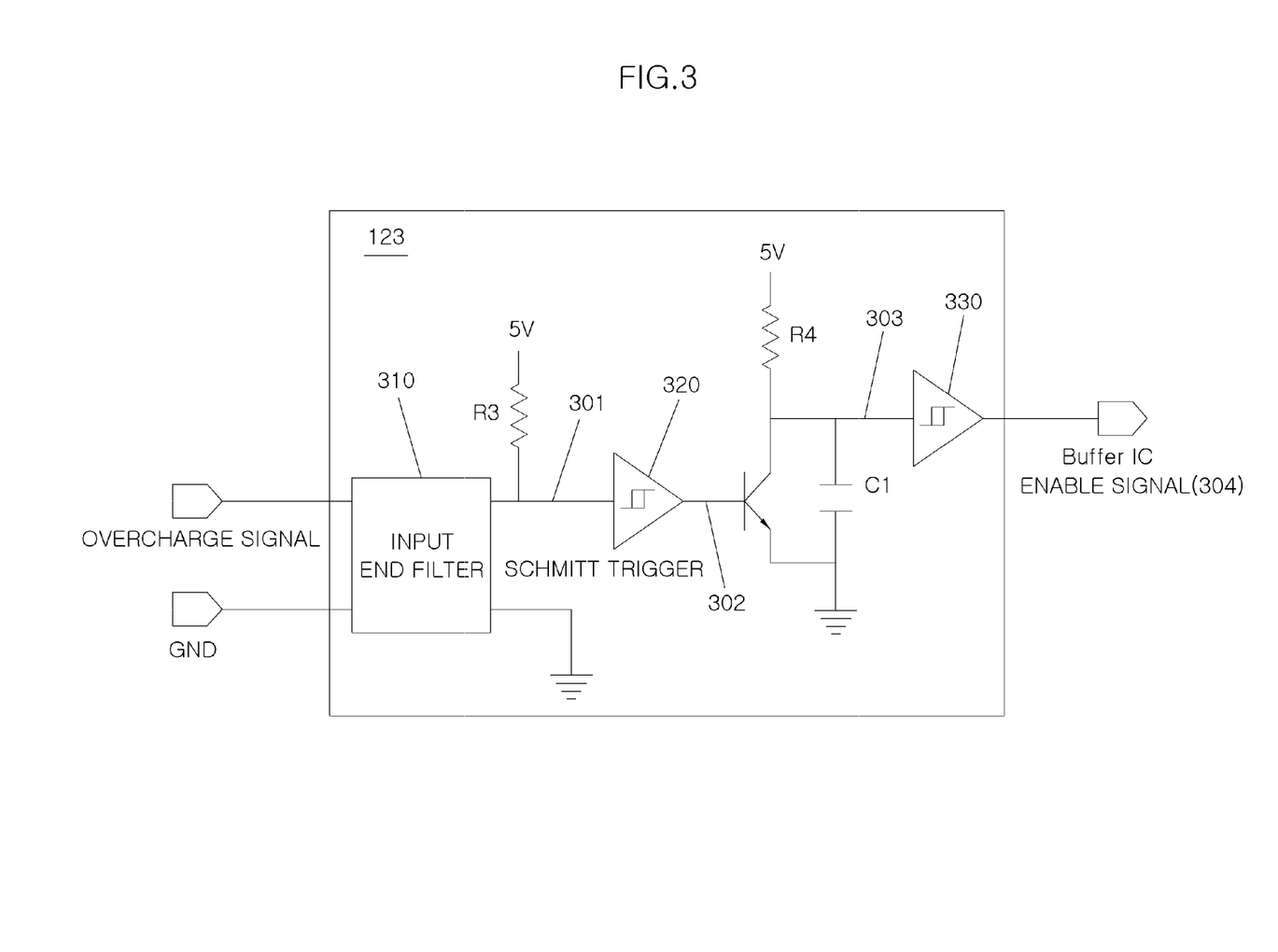
FIG. 3 is a constitution diagram of a circuit of an overcharge signal processing unit shown in FIG. 1.

Further, the overcharge signal processing unit 123 filters and stabilizes the overcharge signal and removes noise. Detailed circuit configuration of the overcharge signal processing unit 123 is shown in FIG. 3 and this will be described later.

Figure 4:
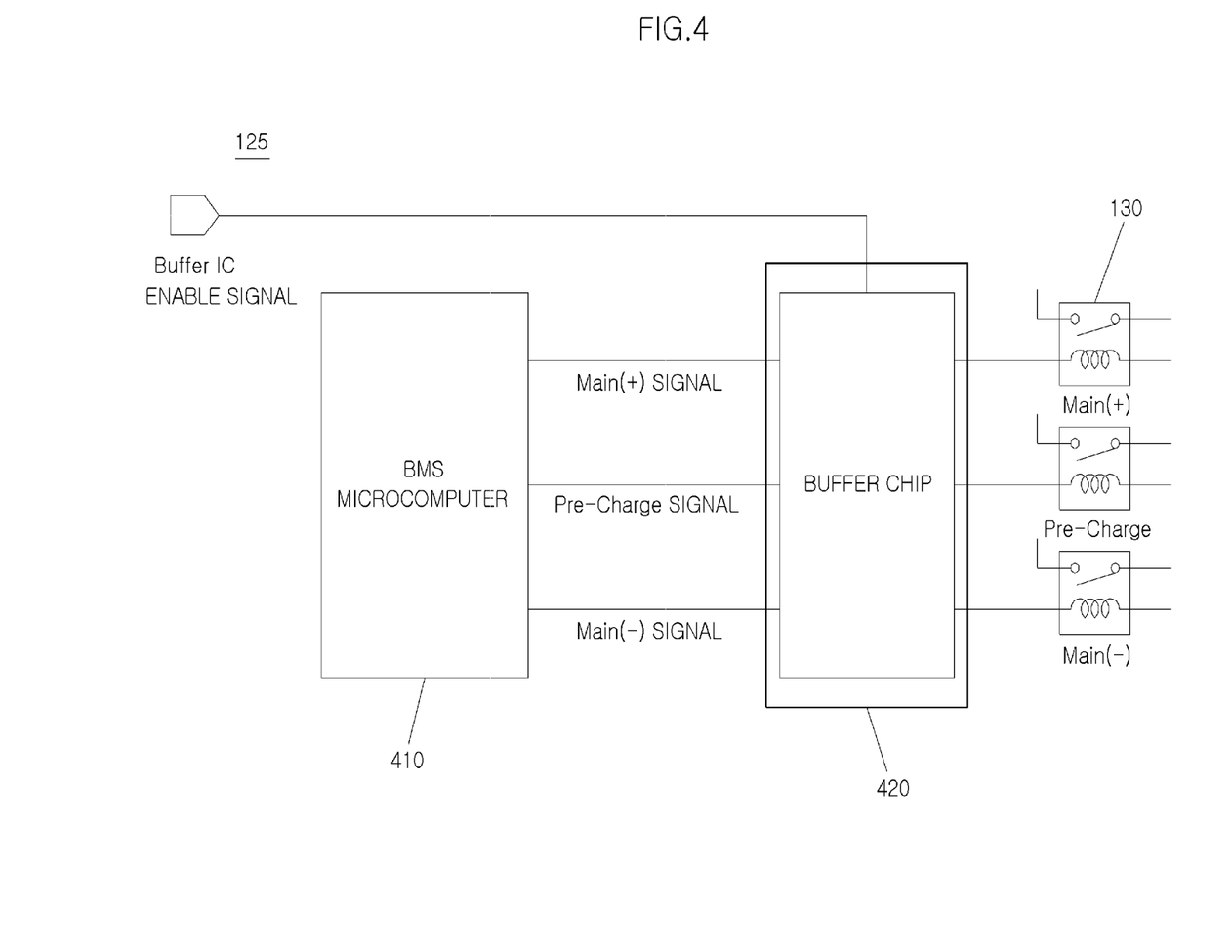
FIG. 4 is a constitution diagram of a circuit of a switch control unit shown in FIG. 1.

Further, the switch control unit 125 compares a hold-up time of the overcharge signal with a preset hold-up time of the overcharge signal, and then turns off the switch 130 to block the charging power source when the hold-up time of the overcharge signal is longer than the preset hold-up time. On the contrary, the switch control unit turns on the switch 130 to connect the charging power source when the hold-up time of the overcharge signal is shorter than the preset hold-up time. Detailed circuit configuration of the switch control unit 125 is shown in FIG. 4 and this will be described later.

The switch 130 functions to connect or block the charging power source for supplying charging power to the battery 110 in response to a control signal of the switch control unit 125. The switch 130 may be a power relay device, but not limited thereto. The switch may be implemented with a semiconductor switch device such as a field effect transistor (FET), a metal oxide semiconductor FET (MOSFET), or an insulated gate bipolar mode transistor (IGBT), a thyristor, a gate turn-off (GTO) thyristor, TRIAC, a silicon controlled rectifier (SCR), an integrated circuit (IC) and the like. In particular, in case of the semiconductor device, a bipolar transistor, a power MOSFET and the like may be used. The power MOSFET operates at a high voltage and a high current and has a construction of a double-diffused metal oxide semiconductor (DMOS) unlikely a general MOSFET.

FIG. 2 is a constitution diagram of a circuit of the overcharge sensing unit 121 shown in FIG. 1. Referring to FIG. 2, the overcharge sensing unit 121 comprises first and second distribution resistances R1 and R2 connected in series for controlling the cell voltage detected from the battery 110, a shunt regulator 210 connected to the distribution resistances R1 and R2 and generating the overcharge signal by being electrically conducted when the cell voltage is greater than the preset overcharge voltage, and a photo coupler 220 for transmitting the overcharge signal to the overcharge signal processing unit 123.

In particular, the preset overcharge voltage is determined by using the following equation.

$$V_{preset\ overcharge\ voltage} = V_{ref} \times (1+R1/R2) \quad \text{[Equation 1]}$$

Where, $V_{ref}$ represents the voltage of the shunt regulator 210, R1 represents a first distribution resistance, and R2 represents a second distribution resistance. In embodiments, the preset overcharge voltage can be set by using the distribution resistances R1 and R2 and the voltage $V_{ref\ of\ the\ shunt\ regulator}$.

FIG. 3 is a constitution diagram of a circuit of an overcharge signal processing unit 123 shown in FIG. 1.

Referring to FIG. 3, the overcharge signal processing unit 123 comprises: an input end filter 310 for filtering and stabilizing the overcharge signal; and two-stage Schmitt triggers 320 and 330 for stabilizing the primary and secondary filtered input signals 301 and 303 that are signals filtered in order to prevent malfunction and converting those signals to an enable signal 304 for enabling the switch control unit 125 (see FIG. 1).

The two-stage Schmitt triggers 320 and 330 become a Schmitt trigger IC and includes a first Schmitt trigger 320 and a second Schmitt trigger 330. Further, a capacitor C1 used in controlling capacitance for controlling a reaction rate of output signal 302 is provided between the first Schmitt trigger 320 and the second Schmitt trigger 330.

Moreover, in order to adjust time constant such that the battery does not operate even when any erroneous operation of the overcharge signal occurs due to noise, a resistor R4 is disposed to be connected in parallel to the capacitor C1.

FIG. 4 is a constitution diagram of a circuit of the switch control unit 125 shown in FIG. 1. Referring to FIG. 4, the switch control unit 125 comprises a BMS microcomputer 410 and a buffer chip 420. The BMS microcomputer 410, in general, refers to a microcomputer configured in the BMS 120 itself. Therefore, it does not require a central processing unit (CPU) for driving a separate flip-flops as described above. The buffer chip 420 is composed of a buffer integrated circuit.

The buffer chip 420 is enabled by the enable signal 304 from the overcharge signal processing unit 123. Under the enabled state, the buffer chip receives a control signal from the BMS microcomputer 410 and turns on the switch 130 to supply charging power to the battery 110 (see FIG. 1) or otherwise turns off to block the charging power.

Figure 5:
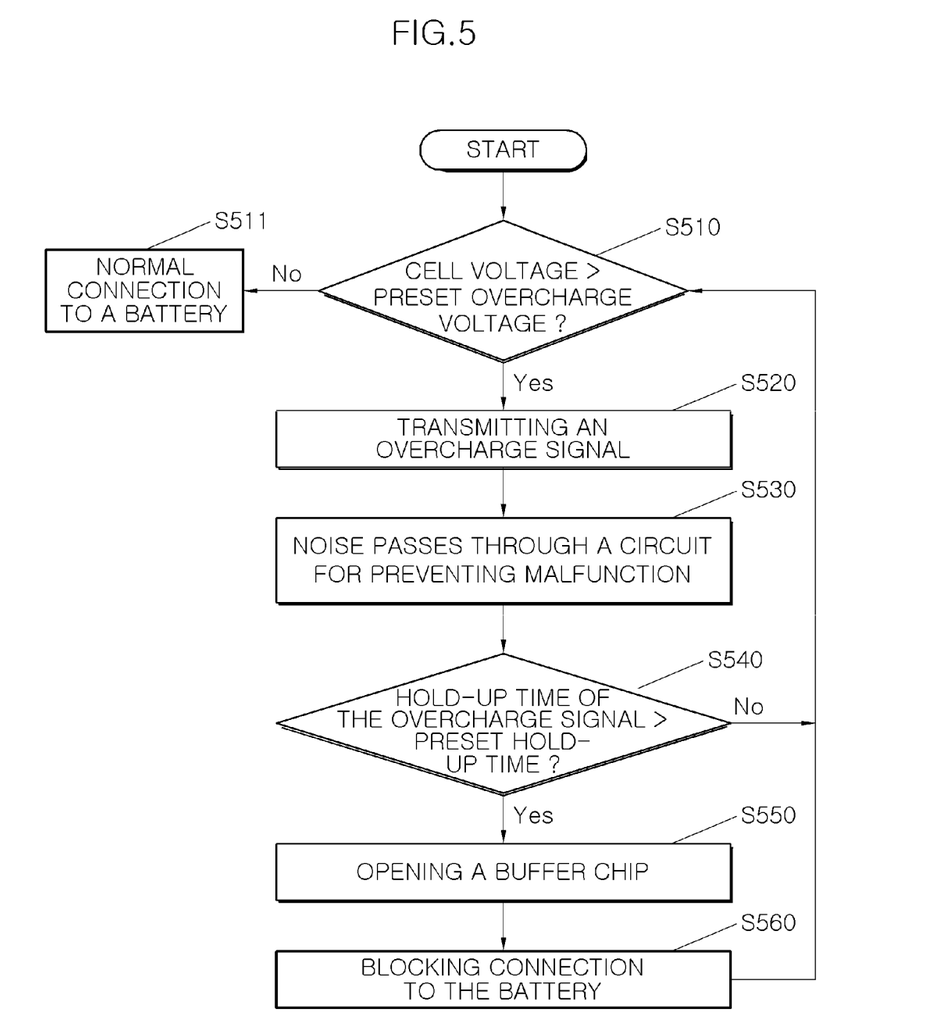
FIG. 5 is a flow chart illustrating processes of overcharge protection control, according to an embodiment of the present invention.

FIG. 5 is a flow chart illustrating processes of overcharge protection control, according to an embodiment of the present invention. Referring to FIG. 5, the overcharge sensing unit 121 of the BMS 120 detects the cell voltage of the battery 110 and then compares the cell voltage with the preset overcharge voltage (see step S510).

As a result of the comparison, if the cell voltage is not greater than the preset overcharge voltage, the overcharge sensing unit generates a signal indicative of normal connection of the battery (see step S511). On the contrary, if the cell voltage is determined as being lower than the preset overcharge voltage at step S510, the overcharge sensing unit generates an overcharge signal and transmits the overcharge signal to the overcharge signal processing unit 123 (see step S520).

Thereafter, the overcharge signal processing unit 123 of the BMS 120 processes the overcharge signal to reduce noise and stabilize the signal (see step S530). It is of course possible to omit the steps S520 and S530.

Thereafter, the switch control unit 125 of the BMS 120 compares a hold-up of the overcharge signal with a preset hold-up time of the overcharge signal (see step S540). The hold-up time of the overcharge signal is determined by the following equation:

$$t_{preset\ hold-up\ time} = 1/(2\pi \times R4 \times C1) \quad \text{[Equation 2]}$$

Where, R4 represents resistance and C1 represents capacitance.

As can be seen from the above equation, the preset hold-up time is a preset delay time that is controlled with values of R4 and C1 shown in FIG. 2.

Referring to FIG. 5 continuously, as a result of the comparison, if the hold-up time of the overcharge signal is longer than the preset hold-up time, the switch control unit transmits an enable signal to the buffer chip 420 (see FIG. 4) of the switch control unit 125 and turns off the switch 130 to prevent the charging power source from being connected to the battery 110 (see step S550).

On the contrary, if it is determined at step S540 that the hold-up time of the overcharge signal is shorter than the preset hold-up time, the process proceeds to step S510.

Figure 6:
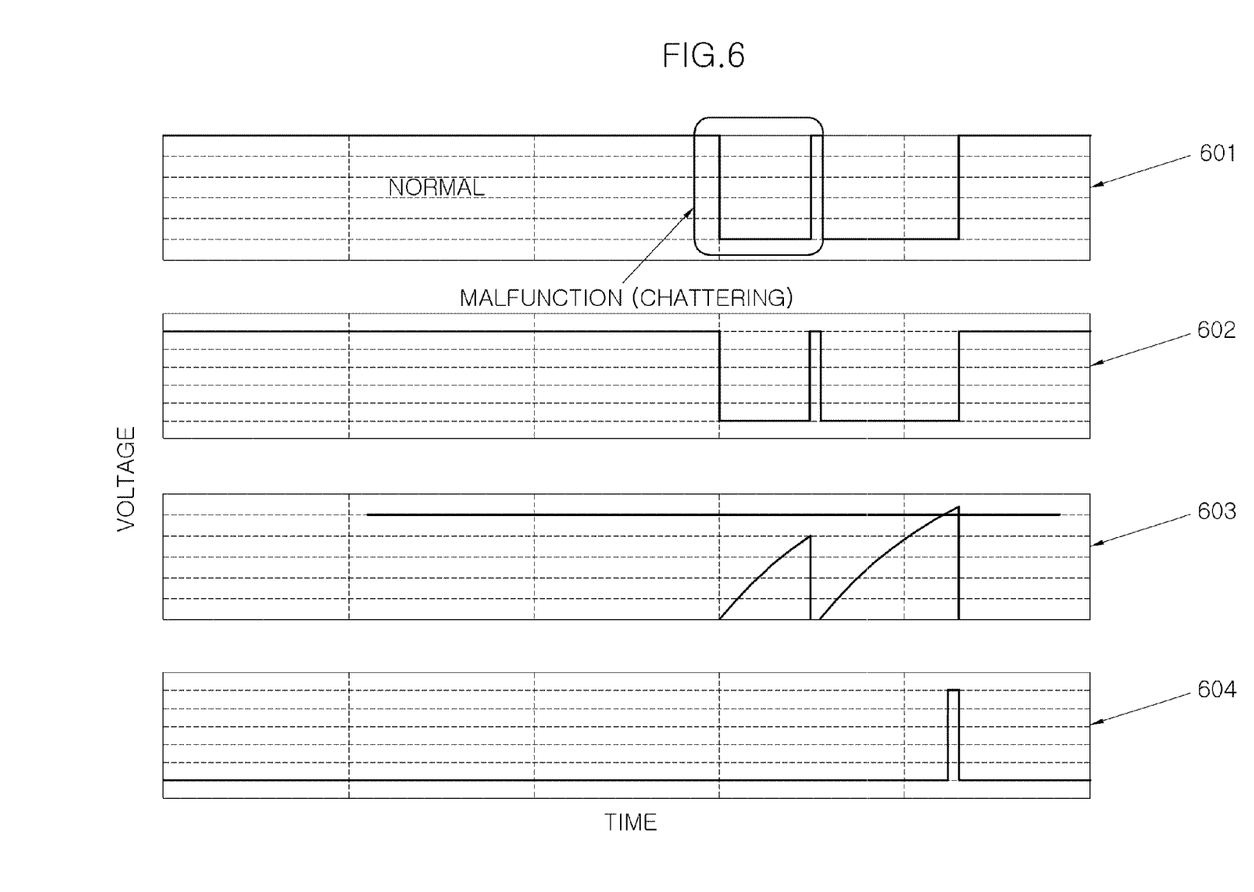
FIG. 6 is a graph illustrating operation modes under an overcharged state, according to an embodiment of the present invention.

FIG. 6 is a graph illustrating operation modes under an overcharged state, according to an embodiment of the present invention. Referring to FIG. 6, the overcharge signal processing unit adjusts time constant set by the capacitor C1 and the resistor R4, so that the battery does not operate even when any erroneous operation of the overcharge signal occurs due to noise.

Specifically, in this figure, the primary filter input signal 301, the intermediate output signal 302, the secondary filter input signal 303 and the enable signal 304, which are shown in FIG. 3, are plotted as graphs 601, 602, 603 and 604 respectively. As illustrated in FIG. 6, the RC time constant can be adjusted such that the battery does not operate when any erroneous operation of the overcharge signal (i.e., chattering) occurs. As illustrated in the graph 601 plotting the first filter input signal 301, in embodiments, the overcharge signal applied below the time set by R and C does not affect the graph 604 plotting the enable signal 30 for a switching action. Therefore, even if any overcharge signal is input due to generation of noise, the battery can work normally. A table for facilitating understanding of this is shown below.

TABLE 1

| Overcharge signal 301 | Secondary filter input signal 303 | Enable signal 304 | Switching action |
|---|---|---|---|
| H (Normal) | L | L | ON |
| L (Overcharge) | H | H | OFF |

While embodiments of the present invention have been described, it will be apparent to those skilled in the art that various changes and modifications may be made without departing from the spirit and scope of the invention as defined in the following claims.

What is claimed is:

1. An overcharge protection circuit comprising:
   a battery;
   a battery management system (BMS) having an overcharge sensing unit for detecting cell voltage of the battery, comparing the cell voltage with a preset overcharge voltage, and then generating either a signal indicative of normal connection of the battery or an overcharge signal depending on a result of the comparison and a switch control unit for generating a control signal depending on a result of comparing a hold-up time of the overcharge signal with a preset hold-up time of the overcharge signal; and
   a switch for connecting or blocking a power source for supplying charging power to the battery in response to the control signal.

2. The overcharge protection circuit according to claim 1, wherein the BMS further comprises an overcharge signal processing unit for processing the overcharge signal to reduce noise.

3. The overcharge protection circuit according to claim 2, wherein the overcharge signal processing unit comprises:
   an input end filter for filtering and stabilizing the overcharge signal; and
   two-stage Schmitt triggers for stabilizing the filtered overcharge signal to prevent malfunction and converting the signal to an enable signal for enabling the switch control unit.

4. The overcharge protection circuit according to claim 1, wherein the overcharge sensing unit comprises:
   a plurality of distribution resistances connected in series for controlling the cell voltage; and
   a shunt regulator connected to the distribution resistances to generate the overcharge signal by being electrically conducted when the cell voltage is greater than the preset overcharge voltage.

5. The overcharge protection circuit according to claim 4, wherein the preset overcharge voltage is set by using resistance values of the distribution resistances and voltages of the shunt regulator.

6. The overcharge protection circuit according to claim 3, wherein the overcharge signal processing unit comprises a capacitor disposed between the two-stage Schmitt triggers to control a reaction rate of the filtered overcharge signal with capacitance.

7. The overcharge protection circuit of claim 6, wherein the overcharge signal processing unit adjusts time constant set by the capacitor and resistances connected in parallel to the capacitor such that the overcharge signal processing unit does not operate even when erroneous operation of the overcharge signal occurs due to noise.

8. The overcharge protection circuit according to claim 1, wherein the switch is a relay device.

9. The overcharge protection circuit according to claim 1, wherein the switch control unit comprises a single buffer chip.

10. A method of controlling an overcharge protection circuit, comprising:
    a cell voltage sensing step in which an overcharge sensing unit of a battery management system (BMS) detects cell voltage of a battery;
    a voltage comparison step in which the overcharge sensing unit of the BMS compares the cell voltage with a preset overcharge voltage;
    an overcharge signal generating step in which the overcharge sensing unit of the BMS generates either a signal indicative of normal connection of the battery or an overcharge signal of the battery depending on a result of the comparison;
    a control signal generating step in which a switch control unit of the BMS generates a control signal depending on a result of comparing a hold-up time of the overcharge signal with a preset hold-up time of the overcharge signal; and
    a connecting/blocking step in which a switch connects or blocks a power source for supplying charging power to the battery in response to the control signal.

11. The method according to claim 10, wherein the control signal generating step further comprises a noise reduction step in which the overcharge signal processing unit of the BMS processes the overcharge signal to reduce noise.

12. The method according to claim 11, wherein the noise reduction step comprises:
    a filtering and stabilizing step in which an input end filter of the overcharge signal processing unit filters and stabilizes the overcharge signal; and
    a conversion step in which two-stage Schmitt triggers of the overcharge signal processing unit stabilize the filtered overcharge signal to prevent malfunction and convert the signal to an enable signal for enabling the switch control unit.

13. The method according to claim 10, wherein the overcharge sensing unit comprises:
- a plurality of distribution resistances connected in series for controlling the cell voltage; and
- a shunt regulator connected to the distribution resistances to generate the overcharge signal by being conducted when the cell voltage is greater than the preset overcharge voltage.

14. The method according to claim 13, wherein the preset overcharge voltage is set by using the plurality of distributed resistances and voltages of the shunt regulator.

15. The method according to claim 12, wherein the overcharge signal processing unit comprises a capacitor disposed between the two-stage Schmitt triggers to control a reaction rate of the filtered overcharge signal with capacitance.

16. The method according to claim 15, wherein the overcharge signal processing unit adjusts time constant set by the capacitor and resistances connected in parallel to the capacitor such that the overcharge signal processing unit does not operate when any erroneous operation of the overcharge signal occurs due to noise.

17. The method according to claim 10, wherein the switch is a relay device.

18. The method according to claim 10, wherein the switch control unit comprises a single buffer chip.

* * * * *